(12) United States Patent
Halm

(10) Patent No.: US 6,178,582 B1
(45) Date of Patent: *Jan. 30, 2001

(54) TOOTHBRUSH COMPRISING A RESILIENT FLEX REGION

(75) Inventor: Hans Halm, Baleares (ES)

(73) Assignee: Smithkline Beecham Consumer Healthcare GmbH (DE)

(*) Notice: Under 35 U.S.C. 154(b), the term of this patent shall be extended for 0 days.

This patent is subject to a terminal disclaimer.

(21) Appl. No.: 09/029,274

(22) PCT Filed: Aug. 22, 1996

(86) PCT No.: PCT/EP96/03721

§ 371 Date: May 26, 1998

§ 102(e) Date: May 26, 1998

(87) PCT Pub. No.: WO97/07707

PCT Pub. Date: Mar. 6, 1997

Related U.S. Application Data (62) Continuation-in-part of application No. 08/437,759, filed on May 9, 1995, now Pat. No. 5,651,158, which is a continuation of application No. 08/306,842, filed on Sep. 14, 1994, now abandoned, which is a continuation of application No. 08/122,408, filed as application No. PCT/EP92/00696 on Mar. 25, 1992, now abandoned.

(30) Foreign Application Priority Data

Aug. 25, 1995 (GB) .................................. 9517450

(51) Int. Cl.$^7$ ........................................ A46B 9/04
(52) U.S. Cl. ................ 15/167.1; 15/172; 300/21
(58) Field of Search ................ 15/167.1, 172; 300/21

(56) References Cited

U.S. PATENT DOCUMENTS

| | | |
|---|---|---|
| D. 200,395 | 2/1965 | Brennesholtz . |
| D. 302,492 | 8/1989 | Embasz . |
| D. 365,209 * | 12/1995 | Plummer .................. D4/104 |
| 759,490 | 5/1904 | Yates . |
| 914,501 | 3/1909 | McEachern . |

(List continued on next page.)

FOREIGN PATENT DOCUMENTS

| | | |
|---|---|---|
| 508048 | 12/1954 | (CA) . |
| 508049 | 12/1954 | (CA) . |
| 520692 | 1/1956 | (CA) . |
| 460 705 | 8/1968 | (CH) . |
| 393 882 | 6/1923 | (DE) . |

(List continued on next page.)

OTHER PUBLICATIONS

The Condensed Chemical Dictionary, Seventh Edition, Definition of "Alathon", 1966.*
Hawley's Condensed Chemical Dictionary, Eleventh Edition, Definition of "Alathon", 1987.*
Dupont Alathon® Polyethylene Resins, "Alathon® 3170 Polyethylene Resin for Injection Molding and Extrusion," DUP0000032.

(List continued on next page.)

Primary Examiner—Terrence R. Till
(74) Attorney, Agent, or Firm—Finnegan, Henderson, Farabow, Garrett & Dunner (57) ABSTRACT

A toothbrush in which the head comprises a base region adjoining the handle, and a tip region, the tip region being flexibly and resiliently linked at a link region to the base region in a manner which enables the tip region to fold or pivot resiliently relative to the base during toothbrushing.

15 Claims, 10 Drawing Sheets

U.S. PATENT DOCUMENTS

| | | |
|---|---|---|
| 1,327,807 | 1/1920 | Burleigh . |
| 1,466,723 | 9/1923 | Izawa . |
| 1,924,337 | 8/1933 | Troupa . |
| 1,927,365 | 9/1933 | Frolio . |
| 1,928,328 | 9/1933 | Carpenter . |
| 2,003,243 | 5/1935 | Campbell et al. . |
| 2,172,624 | 9/1939 | Robert . |
| 2,254,365 | 9/1941 | Griffith et al. . |
| 2,266,195 | 12/1941 | Hallock . |
| 2,438,268 * | 3/1948 | Bressler ............................. 15/167.1 |
| 2,443,297 | 6/1948 | Bressler . |
| 2,631,320 | 3/1953 | Bressler . |
| 2,650,383 | 9/1953 | Bressler . |
| 2,676,350 | 4/1954 | Bressler . |
| 2,685,703 | 8/1954 | Dellenbach . |
| 2,722,031 | 11/1955 | Bressler . |
| 2,730,747 | 1/1956 | Bressler . |
| 2,807,820 | 10/1957 | Dinhofer . |
| 2,864,111 | 12/1958 | Rotceig . |
| 3,000,030 | 9/1961 | Ours . |
| 3,152,349 | 10/1964 | Brennesholtz . |
| 3,188,672 | 6/1965 | Gary . |
| 3,253,292 | 5/1966 | Herschensohn . |
| 3,493,991 | 2/1970 | DeBianchi . |
| 3,616,170 | 10/1971 | Closson, Jr. . |
| 3,805,986 | 4/1974 | Gaudin . |
| 3,821,333 | 6/1974 | Goodwin et al. . |
| 3,992,958 | 11/1976 | Bonnefon . |
| 4,263,691 | 4/1981 | Pakarnseree . |
| 4,488,328 * | 12/1984 | Hyman ............................. 15/167.1 |
| 4,520,526 | 6/1985 | Peters . |
| 4,575,894 | 3/1986 | Stevens et al. . |
| 4,654,922 * | 4/1987 | Chen ................................... 15/172 |
| 4,691,405 | 9/1987 | Reed . |
| 4,712,267 | 12/1987 | Cheng . |
| 4,776,054 * | 10/1988 | Rauch ............................... 15/167.1 |
| 5,052,071 | 10/1991 | Halm . |
| 5,054,154 | 10/1991 | Schiffer et al. . |
| 5,114,214 | 5/1992 | Barman . |
| 5,373,602 | 12/1994 | Bang . |
| 5,758,383 * | 6/1998 | Hohlbein ........................... 15/167.1 |
| 5,802,656 * | 9/1998 | Dawson et al. .................... 15/167.1 |
| 5,839,148 * | 11/1998 | Volpenhein ........................ 15/167.1 |
| 5,946,758 * | 9/1999 | Hohlbein et al. .................. 15/167.1 |
| 5,946,759 * | 9/1999 | Cann .................................. 15/167.1 |

FOREIGN PATENT DOCUMENTS

| | | |
|---|---|---|
| 1 233 821 | 2/1967 | (DE) . |
| 2 500 132 | 7/1976 | (DE) . |
| 353 949 | 12/1979 | (DE) . |
| 3 628 722 | 2/1988 | (DE) . |
| 3 737 223 | 5/1989 | (DE) . |
| 3 840 136 | 5/1990 | (DE) . |
| 3 923 495 | 1/1991 | (DE) . |
| 336 641 | 10/1989 | (EP) . |
| 604 425 | 7/1994 | (EP) . |
| 442 832 | 9/1912 | (FR) . |
| 707727 | 4/1931 | (FR) . |
| 707727 | 7/1931 | (FR) . |
| 1524055 | 4/1968 | (FR) . |
| 2 621 466 | 4/1989 | (FR) . |
| 2 652 245 | 3/1991 | (FR) . |
| 647 916 | 12/1950 | (GB) . |
| 673 516 | 6/1952 | (GB) . |
| WO 91/19438 | 12/1991 | (WO) . |
| WO 92/17093 * | 10/1992 | (WO) ................................ 15/167.1 |
| WO 93/14671 | 8/1993 | (WO) . |
| WO 96/02165 | 2/1996 | (WO) . |

OTHER PUBLICATIONS

Dupont Alathon® EVA, Case History, Item: Mouth Guard, DUP0000033.

Dupont Alathon® EVA, Processing Notes, "The Cost Advantage for EVA Resins in Injection Molding," DUP0000034–DUP0000036.

Dupont Alathon® EVA, Flying Karpet Toboggan, DUP0000037.

Dupont Alathon® Ethylene/Vinyl Acetate Copolymer Resins, Injection Molding Processing Guide, DUP0000038–DUP0000050.

Dupont Product Information Service, "Casual Footwear Line Features E/VA–Based Sole" (Aug. 3, 1970), DUP0000051–DUP0000052.

Dupont Magazine, "Boom at the Bottom," pp. 10–11 (Jul.–Aug. 1973), DUP0000053–DUP0000054.

Letter from D.T. Boyle of the Plastics Department—Polyolefins Divisions, Chestnut Run, DUP0000055.

EVA Injection Molded Footwear, DUP0000056–DUP0000057.

Dupont Alathon® EVA, Shoe Soling Material, DUP0000058.

Letter from R.E. Shaw of the Plastics Department re: Alathon® Injection Molded Shoe Sole Program (Jan. 8, 1974), DUP0000059–DUP0000060.

Letter from D.T. Boyle of the Plastics Department re: Alathon® EVA Shoe Sole Program Position Report (Dec. 31, 1973), DUP0000061–DUP0000067.

Dupont Alathon® EVA, Blow Molded Puppy, DUP0000068.

Dupont Alathon® EVA, Processing Notes, "Blow Moloding of Alathon® EVA Copolymers" DUP0000069–DUP0000071.

Advertisement for Eldita's® Shoes, "The Next Step for New York," DUP000072.

Dupont Alathon® EVA, Processing Notes, "The Cost Advantage of EVA Resins in Injection Molding," DUP0000001–DUP0000003.

Dupont Alathon® EVA, Case History, Item: Blood Syringe, DUP0000004.

Dupont Alathon® EVA, Case History, Item: Swimming Suite Bra Cup, DUP0000005.

Dupont Alathon® EVA, Case History, Item: Swimming Pool Filter Gasket, DUP0000006.

Dupont Alathon® EVA, Case History, Item: Defect Card Holder, DUP0000007.

Dupont Alathon® EVA, Case History, Item: Camera Cover, DUP0000008.

Dupont Alathon® EVA, Case History, Item: "Pyrex" Ware Store'n See, DUP0000009.

Dupont Alathon® EVA, Case History, Item: Corrugated Hose, DUP0000010.

Dupont Alathon® EVA, Case History, Item: Bumper Stop Mounting Foot, DUP0000011.

Dupont Alathon® EVA, Case History, Item: Bellows for Toy Gun, DUP0000012.

Paul D. Kohl, "Alathon® Ethylene Vinyl Acetate Copolymers Injection Molding," DUP0000013–DUP0000025.

Dupont Alathon® Polyethyelne Resins, "Alathon® 3185 Polyethylene Resin for Molding and Extrusion," DUP0000026–DUP0000027.

Dupont Alathon® Polyethylene Resins, "Alathon® 3180 Polyethylene Resin for Injection Molding and Extrusion," DUP0000028–DUP0000029.

Dupont Alathon® Polyethylene Resins, "Alathon® 3175 Polyethylene Resin for Injection Molding and Extrusion," DUP0000030–DUP0000031.

RAPRA Information Services, Alathon Search, 1972–1999, pp. 1–16.

* cited by examiner

TOOTHBRUSH COMPRISING A RESILIENT FLEX REGION

CROSS-REFERENCE TO RELATED APPLICATIONS

This is a continuation-in-part of application Ser. No. 08/437,759, filed May 9, 1995, now U.S. Pat. No. 5,651,158, which is a continuation of application Ser. No. 08/306,842, filed Sep. 14, 1994, now abandoned, which is a continuation of application Ser. No. 08/122,408, filed on Sep. 27, 1993, filed as PCT/EP92/00696 on Mar. 25, 1992, now abandoned.

This invention relates to toothbrushes, in particular to toothbrushes having a flexibly linked region in their head.

BACKGROUND OF THE INVENTION

Toothbrushes having a flexibly linked region in their head are known. For example WO 92/17093 discloses a toothbrush in which the head is divided into two or more segments which are flexibly and resiliently linked to each other and/or to the handle of the toothbrush. A particular form of the toothbrush of WO 92/17093 has a head which has grooves in the reverse face of the head from which the bristles extend, these grooves being filled with an elastomeric material to modulate the flexibility. The embodiments disclosed in have their grooves distributed in a generally uniform distribution over the reverse face of the head, or around the longitudinal mid point of the head, so as to enable the whole head to accommodate itself to the curved shape of the teeth. WO 96/02165 discloses toothbrushes with flexible heads similar in construction to those of WO 92/17093, and having a generally concave profile of bristle ends. DE-G 87 05 474.4 discloses a toothbrush in which the tip region of the head is hinged to a base region of the head and an operating button on the handle allows the tip region to fold relative to the base region.

SUMMARY OF THE INVENTION

It is an object of this invention to provide a toothbrush in which the flexibility of the head is concentrated in the tip of the head remote from the handle, so as to improve the ability of the toothbrush to clean surfaces of the teeth which face the back of the mouth.

According to this invention a toothbrush comprises a handle with a head, the head having a base end facing the handle and a tip end remote from the base end, the head adjoining the handle at the base end of the head, the head and handle being disposed along a longitudinal toothbrush axis, the head having bristles extending from a bristle face of the head, characterised in that the head comprises a substantially rigid base region adjoining the toothbrush handle and extending from the base end of the head to a link region situated between the base end and the tip end, and a tip region extending from the tip end of the head to the link region, both the base region and tip region being bristle bearing, the tip region being flexibly and resiliently linked at the link region to the base region.

DETAILED DESCRIPTION OF THE INVENTION

The above-described construction of toothbrush concentrates flexibility of the head at the tip end of the toothbrush, the linking of the tip region and base region is preferably in a manner which enables the tip region to fold or pivot resiliently relative to the base region during toothbrushing. The link provided at the link region between the tip region and the base region allows the tip region to fold or pivot during use about a fold or pivot axis which is in the plane of the bristle face and generally transverse to the longitudinal toothbrush axis such that bristles on the tip region can lean backwards, i.e so that the free ends of bristles in the tip region swing toward the handle, assisting the bristles to clean surfaces of the teeth which face the back of the mouth. The flexible linking also helps to prevent excessive brushing pressure from being applied during toothbrushing.

Normally the head of the toothbrush will adjoin the handle of the toothbrush via a neck region between the base of the toothbrush head and the part of the handle which is held during use.

The base region is substantially rigid, that is, during the operation of brushing the teeth the base region does not significantly flex beyond the usual limits of flexing of a plastics material toothbrush head.

The link region is preferably in the longitudinal half of the head furthest from the base of the head. Suitably the base region extends for at least 60%, for example at least 75% of the distance between the base end of the head and the tip of the head.

The tip region may also be substantially rigid, so that the tip region does not itself significantly flex apart from its folding or pivoting relative to the base region. The tip region may be of a variety of shapes accommodated to the shape of the tip of the head, e.g. circular, triangular (including ogival), rectangular, elongate, lozenge shape etc.

In its non-stressed condition, i.e when not being used, the bristle face of the tip region and base region of the toothbrush of this invention may be substantially coplanar, i.e with a substantially 180° angle between them. In a preferred embodiment of the toothbrush of this invention the bristle face of the tip region forms an angle of less than 180° with the bristle face of the base region, e.g 150°–179°, suitably 155°–170°. A suitable angle is one in which the free ends of the bristles on the handle side of the tip portion are in close proximity to, e.g touching, the free ends of bristles on the tip side of the base region.

The link region between the tip region and the base region in one embodiment of this invention comprises an aperture, space or chasm in the head material between the tip and base regions which is bridged by means of one or more thin links of flexible and resilient plastics material. In this construction the head is effectively in two regions linked by such links. Such links may comprise thin spines, thin strips, or a continuous thin membrane, made of a both flexible and resilient plastics material. These spines, thin strips or membrane may be in the same plane as a substantially planar head, or may slope or may be curved out of planarity. The plastics material may be the same plastics material as the tip and base regions but being flexible by virtue of thinness, e.g. the tip, base and bridge(s) may be integrally moulded.

In another embodiment of this invention the link region between the tip region and the base region may comprise a composite region between the tip region and base regions, the composite region having structural elements made of both plastics material and an elastomeric material. For example the composite region may comprise an aperture, space or chasm in the head material between the tip and base regions which is bridged by means of a combination of thin spines, strips or a continuous membrane of a both flexible and resilient plastics material, e.g integral with the head, and also by an elastomeric material in the aperture, space or chasm. These spines, thin strips or membrane may be in the same plane as a substantially planar head, or may slope or may be curved or folded out of planarity. In this construction the head is effectively in two regions linked by such links, and the links are embedded in a covering layer of rubber.

Such a composite region may for example comprise a net, ladder, latticework, cellular or trellis structure of plastics material integral with the material of the head, with interstices containing the elastomeric material. Such a composite region may for example comprise one or more, for example two, strips of a plastics material integral with the material of the head, the strips being thinner than the thickness of the head, and extending between the tip region and base region to bridge an aperture, space or chasm between the tip region and the base region, the aperture, space or chasm also containing an elastomeric material, suitably bonded to the sides of the space and to the strips and suitably substantially filling the aperture, space or chasm, optionally also bulging above the surface of the surrounding plastics material of the head. Relative to the thickness of the toothbrush head the strips in such a construction may be closer to the bristle face than to the back of the head. The plastics material parts in such a composite region may be thick enough to contribute materially to the flexibility and resilience of the link region, or alternatively they may be so thin as to contribute little to the flexibility and resilience of the link region, and may thus serve simply to retain the tip and head regions together before the elastomer is added.

In another embodiment of this invention the link region between the tip region and the base region may comprise an aperture, space or chasm in the head material between the tip and base regions which is bridged solely by means of a complete or partial filling of an elastomeric material. In this construction the head is effectively in two regions with a gap between them containing the elastomer. This elastomeric material is preferably bonded to the tip region and base region on opposite sides of the aperture, space or chasm so as to hold the tip region and base region together.

The above-mentioned apertures or spaces may comprise a slot, chasm or cut out across the width of the head, dividing the base region from the tip region. Such an aperture may be open at the bristle face of the head and/or at the opposite face of the head, and may pass completely through the head. Such apertures, spaces or chasms may be of various shapes, for example widthways slots. These may in plan be substantially straight aligned widthways, curved or angular, e.g. generally "C", "U" or "V" shaped. In such a construction the convex bulge of the "U" or "C" or the apex of the "V" may point either toward the handle or toward the tip of the head away from the handle. Alternatively such aperture, space or chasms may be narrow at the edges of the head and widen toward the centre of the head or vice versa.

Suitably for example the aperture, space or chasm may comprise one or more, preferably one, grooves with a depth of part of the thickness of the head such that the remaining plastics material at the bottom of the groove forms a thin link of plastics material. The groove may then be filled wholly or partly with elastomeric material to form a composite region.

Alternatively the aperture, space or chasm may pass, in places at least, completely through the thickness of the head, for example leaving bridges of head material crossing the aperture, space or chasm between places where the aperture, space or chasm passes completely through the thickness of the head. Such an aperture, space or chasm may be wholly or partly filled with elastomeric material to thereby form a composite region. When the aperture, space or chasm pass completely through the thickness of the head for the whole of their length they may be wholly or partly filled with an elastomeric material.

The aperture, space or chasm may extend widthways to the sides of the toothbrush head, and elastomeric material therein may be extended around the tip region of the head and/or around the base region of the head to form an elastomeric buffer around the toothbrush head to soften any impact of the toothbrush head with the gums of the user, and also to gently massage the gums. Alternatively elastomeric material may be provided around the tip region of the head to form an elastomeric buffer in a known manner e.g. as in FR 442832 and DE 36 28 722.

When the aperture, space or chasm contains an elastomeric material the outer surface of this elastomeric material may have a corrugated surface, which may further help to control the flexibility of the link region.

In one embodiment of the toothbrush of this invention, the head is constructed such that tip region may fold backwards resiliently relative to the base region, during toothbrushing, about a widthways oriented fold axis that crosses the head in the link region. The fold axis may cross the head in or on the edge of an aperture, space or chasm as described above. In such a construction, the aperture, space or chasm may be shaped such that the widthways oriented fold axis crosses the head of the toothbrush entirely within the aperture, space or chasm. When the link region is a composite region as described above, the folding may occur by bending of the above described plastic material parts, or bending at the point where such a part meets the edge of the aperture, space or chasm.

Such a construction can cause the entire tip region to fold in the bristle direction away from the plane which lies between the bristle face and the opposite face of the head, so that the tip region in effect folds backwards towards the base region during use in toothbrushing. This folding can facilitate tooth cleaning, for example enabling the toothbrush head to accommodate itself better to the curved shape of the row of the teeth.

In an alternative embodiment of the toothbrush of this invention, the tip region and/or link may be constructed and positioned such that the tip region can pivot resiliently relative to the base region during toothbrushing, about a widthways oriented pivot axis that crosses the tip region intermediate between its tip end and its base end.

Such a construction causes pivoting of the tip region about this axis intermediate along its length, i.e. causes the tip region to have a "see-saw" action in which during toothbrushing part of the tip region toward the tip of the head pivots in the bristle direction away from the plane which lies between the bristle face and the opposite face of the head, and the part of the tip region toward the base region of the head pivots in a direction opposite to the bristle direction away from the plane which lies between the bristle face and the opposite face of the head, or vice versa.

In this embodiment such pivoting may for example be achieved in a construction of head in which the tip end of the base region is in the form of two limbs which partly surround a part of the tip region which extends in the base direction between them, with the link between the tip region and the base region. For example the tip end of the base region may be made in the shape of a two pronged fork-like frame, with a part of the tip region between the two prongs of the fork, and a link between the tip region and base region.

In an alternative construction of the head of this embodiment the base end of the tip region may be in the form of two limbs which partly surround a part of the base region which extends in the tip direction between them, with the link between the tip region and the base region. For example the base end of the tip region may be made in the shape of a two pronged fork-like frame, with a part of the base region between the two prongs of the fork, and a link between the tip region and base region.

For example the tip region may be made generally "C", "U" or "V" shaped with its limbs toward the base region, or "Y" shaped with the upper limbs of the Y towards the base region. The part of the base region which extends in the tip direction may lie between the said limbs.

In a construction of head in which the tip end of the base region is in the form of two limbs which partly surround a part of the tip region which extends in the base direction between them, with an aperture between the tip region and the base region, thin links of flexible and resilient plastics material as described above may be provided between the said limbs and the respective tip region. In a construction of head in which the base end of the tip region is in the form of two limbs which partly surround a part of the base region which extends in the tip direction between them, with an aperture between the tip region and the base region, such bridges may be provided between the said limbs and the base region. Suitably in such toothbrushes such bridges may be provided at points widthways diametrically opposite each other to define a pivot axis and to encourage pivoting in a plane in which the longitudinal axis lies. Additionally or alternatively such bridges may be provided at other points in the aperture to encourage pivoting about other axes.

The elastomeric material may be an elastomeric material as commonly used in two-component toothbrushes, e.g. that described in EP 0336641, which can be bonded to plastics materials used for toothbrush handle manufacture. Such an elastomeric material can be injected into the toothbrush mould shortly after injection moulding of the plastics material parts of the toothbrush so that the hot plastics material fuses and bonds with the elastomeric material. This is a generally known process.

In the base region the bristles may be disposed in discrete generally circular section tufts in patterns which are generally known in the field of toothbrushes, for example in longitudinal or widthways rows at a generally conventional spacing. If fused in, the bristles may additionally or alternatively be disposed in "mats" of a cross section which may be circular or other than circular.

In the tip region the bristles may be disposed in discrete generally circular section tufts, or if fused in, the bristles may additionally or alternatively be disposed in "mats" of a cross section which may be circular or other than circular. In the tip region it is preferred to dispose the bristle tufts in either (i) a pattern of discrete tufts arranged in a generally circular or polygonal pattern, or (ii) a single tuft of generally rounded cross section perpendicular to the bristle face, or (iii) a tuft of generally "C" or "U" shaped cross section perpendicular to the bristle face having at least one of the limbs of the "C" or "U" aligned generally parallel to the longitudinal toothbrush axis and with the rounded bend of the "C" or "U" facing the end of the bristle face remote from the handle.

The ends of the bristles remote from the bristle face may be substantially coplanar. Alternatively the ends may undulate about a plane to accommodate the ends of the bristles to the undulating profile of the teeth or to lie in a "battlemented" shape to help clean the interdental spaces. Such undulating surface bristles are known. Additionally or alternately the ends of the bristles remote from the bristle face on the tip region may lie in a different plane to the ends of the bristles remote from the bristle face on the base region of the head. For example the plane of the said ends on the tip region may slope upwards away from the bristle face in the direction away from the handle. This may for example be achieved in the preferred embodiment of the toothbrush of the invention in which the bristle face of the tip region forms an angle of less than 180° with the bristle face of the base region.

The handle may be of generally conventional construction, and may for example include a folded flexible region, and grip pads of elastomeric material, as exemplified in EP 0336641. Elastomeric grip pads may alternatively or additionally be located on other parts of the toothbrush handle as convenient.

The toothbrush of the invention may be made by generally conventional injection moulding techniques, for example in which a plastics material "skeleton" is first made by injection moulding, then elastomer parts if present, are introduced by a subsequent injection moulding step, in which the elastomer is injected as a hot fluid and bonds to the plastics material. Such techniques, and suitable plastics materials and elastomer materials, are well known. If the link region includes an elastomer material then this may be injected with the same injection step as is used to inject elastomer grip pads, and these various regions of elastomeric material may be connected by moulding channels in a known manner.

In the embodiment of the invention in which the bristle face of the tip region forms an angle of less than 180° with the bristle face of the base region, when the link region comprises the above-described composite region between the tip region and base regions, the composite region having structural elements made of both plastics material and an elastomeric material, the toothbrush is preferably made as follows. Firstly the plastics material skeleton is made by injection moulding, with the bristle face substantially flat, then the tip region is folded to the desired angle with the base region, then the elastomer is injected into the link region.

The bristles may also be of generally conventional construction and materials, and may be fastened into the bristle face by generally known techniques. For example small metal clips around the ends of bristles to be fixed into the head, which are then wedged into sockets in the bristle face. Alternatively the bristles may be fused into the head material, again using known techniques.

BRIEF DESCRIPTION OF THE DRAWINGS

The invention will now be described by way of example only with reference to the accompanying figures in which FIGS. 1 to 36 show various plan, side and perspective views of toothbrush heads of the invention, and views without the elastomeric material, thereby showing the underlying construction of the head.

FIG. 2 shows a top view of the toothbrush of FIG. 1.

FIG. 3 shows a side view of the toothbrush of FIG. 1 without the elastomeric material.

FIG. 4 shows a top view of the toothbrush of FIG. 3.

FIG. 6 shows a top view of the toothbrush of FIG. 5.

FIG. 7 shows a side view of the toothbrush of FIG. 5 without the elastomeric material.

FIG. 8 shows a top view of the toothbrush of FIG. 7.

FIG. 10 shows a top view of the toothbrush of FIG. 9.

FIG. 13 shows a top view of the toothbrush of FIG. 12.

FIG. 14 shows a top view of the toothbrush of FIG. 12 without an elastomeric material.

FIG. 16 shows a top view of the toothbrush of FIG. 15.

FIG. 31 shows a side view of the toothbrush of FIG. 30.

FIG. 34 shows a side view of the toothbrush of FIG. 33.

Referring to FIGS. 1 to 4, a toothbrush in which the tip region is constructed to fold resiliently relative to the base region, during toothbrushing, about a widthways oriented fold axis that crosses the head at the edge of the tip region which faces the base region is shown.

This toothbrush comprises a handle 1 with a head 2 integrally adjoining the handle at a base end 3 of the head, the head 2 and handle 1 being disposed along a longitudinal toothbrush axis A—A, the head 2 having bristles 4 extending from a bristle face 5 of the head in a general bristle direction B.

The head 2 comprises two regions. A substantially rigid base region 6 integral with the toothbrush handle 1 extends from the base end 3 of the head 2 to a distance in the longitudinal half of the head 2 furthest from the base 3 of the head. A tip region 7 extends from the extreme tip 8 of the head 2 toward the base region 6. Both the base region 6 and tip region 7 are bristle 4 bearing.

The tip region 7 is flexibly and resiliently linked to the base region 6 by a flexible link which comprises an aperture 9 in the head 2 material between the tip region 7 and the base region 6. The aperture 9 is in the form of a groove, open at the bristle face 5 of the head 2, and extending transversely across the entire width of the head 2. The groove 9 contains a resilient elastomeric material 10. The flexible link between the tip region 7 and the base region 6 consequently is provided by the composite region comprising the thinned plastics material at the base of the groove 9, combined with the elastomeric material 10. The flexible link enables the tip region 7 to fold resiliently relative to the base region 6 backwards towards the handle 1 during toothbrushing, in the direction shown by the arrow in FIG. 1.

Figure 1:
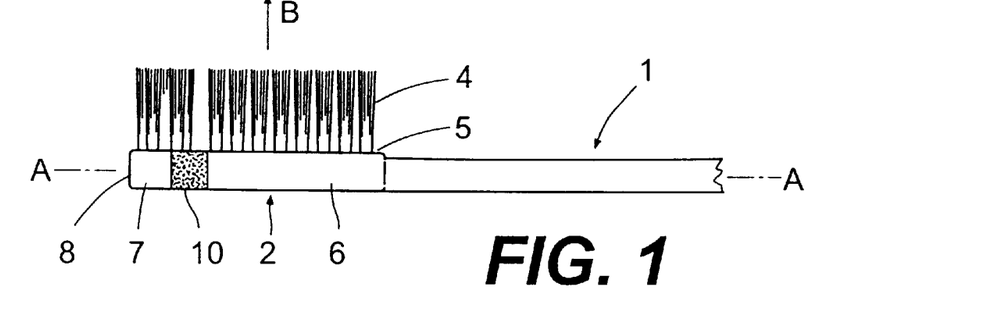
FIG. 1 shows a side view of a toothbrush head integral with the handle and containing an elastomeric material, wherein the head contains bristles extending from the face in direction B.
Figure 2:
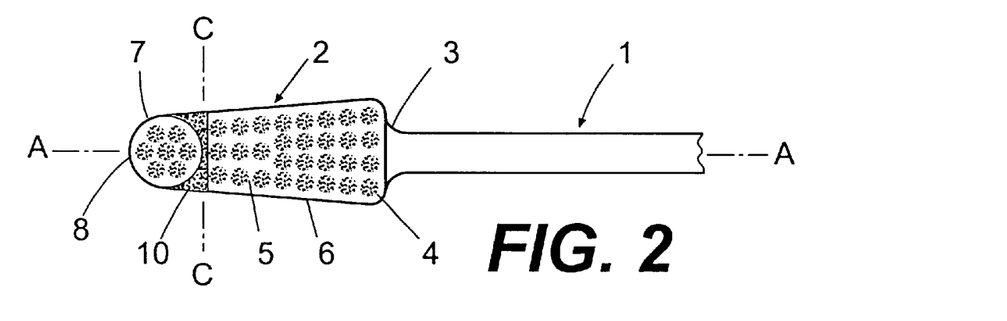

The tip region 7 is of a substantially circular shape, bounded by the curved perimeter of the tip 8 of the head 2 over part of its perimeter, and by a curved edge of the aperture 9 over the part of the perimeter of the tip region 7 facing the base region 6. The opposite edge of the aperture 9, on the side nearest the base 3, extends in a straight edge across the width of the head 2, and the tip region can fold about the axis C—C, which crosses the head 2 transversely in the aperture 9 between the tip region of the head 2 and the base region, so that the tip end of the tip region 7 moves in the bristle direction B.

In the tip region 7 the bristles 4 are arranged in a generally polygonal pattern of tufts which comprises a central tuft surrounded by a regular hexagonal pattern of tufts symmetrically arranged, such that there are equal numbers of tufts i.e. three of the surrounding tufts disposed on either side of the longitudinal axis A—A of the toothbrush.

Figure 3:
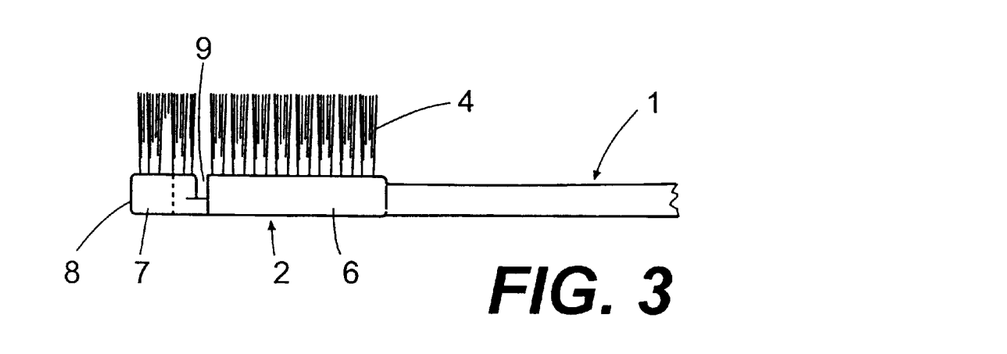
Figure 4:
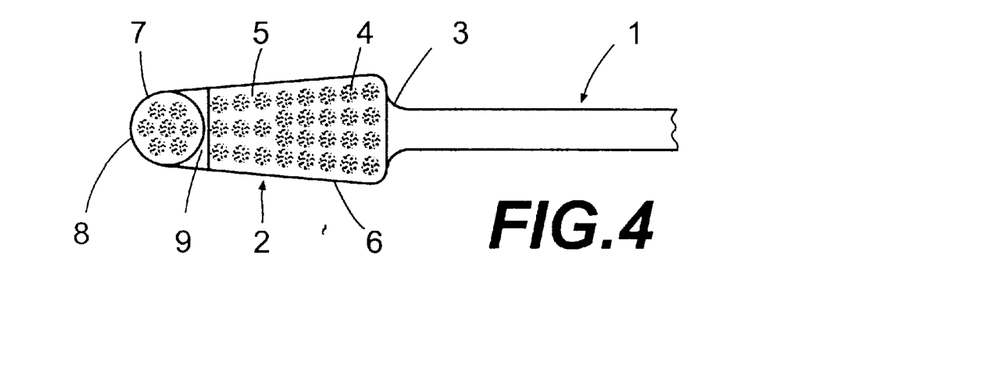

As shown more clearly in FIGS. 3 and 4 which show the head 2 without the elastomeric material 10 in the groove 9, the aperture 9 is in the form of a groove which extends part way through the thickness of the head 2, so as to leave a thinned region of the plastics material of the head 2 of the toothbrush at the bottom of the groove.

Referring to FIGS. 5, 6, 7 and 8, an alternative construction of the head 2 of a toothbrush of this invention in which the tip region 27 is constructed to fold resiliently relative to the base region 6, during toothbrushing, about a widthways oriented fold axis C—C that crosses the head at the edge of the tip region which faces the base region is shown in plan views and a side view.

Figure 7:
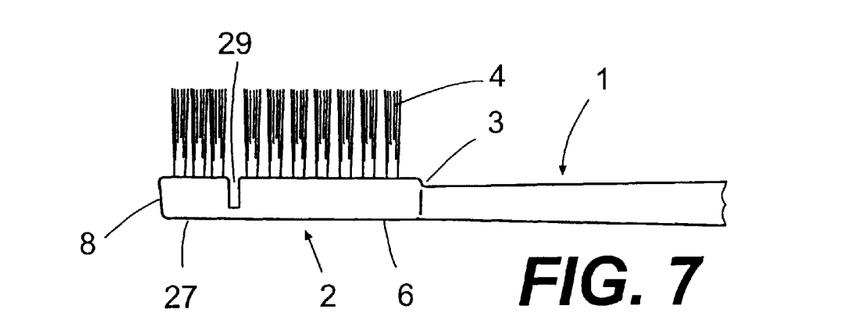
Figure 8:
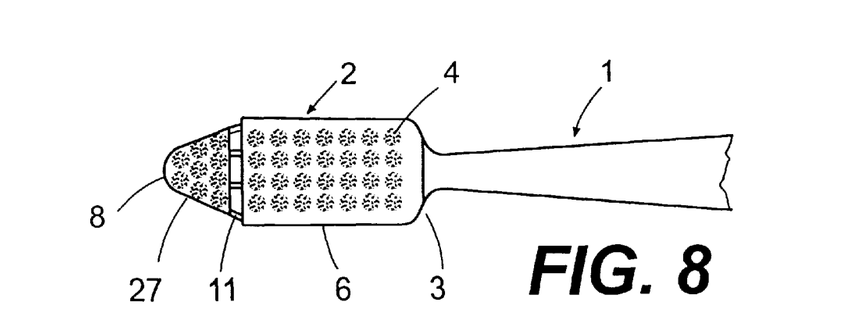

In FIGS. 7 and 8 the head 2 is shown without elastomeric material. Parts corresponding to those of FIGS. 1 to 4 are numbered correspondingly. The tip region 27 is generally triangular in shape. The aperture 29 is in the form of a straight line shaped slot extending widthways across the head 2 of the toothbrush and entirely through its thickness, but incorporating thin integral bridges 11. The tip region 27 can fold about the axis C—C, which crosses the head 2 transversely in the aperture 29.

Figure 5:
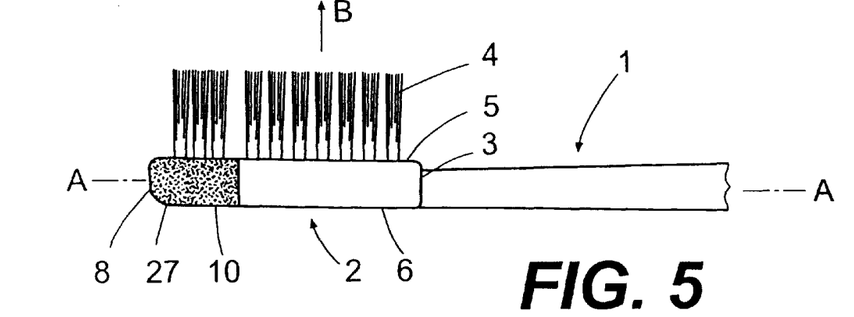
FIG. 5 shows a side view of a second embodiment of a toothbrush head integral with the handle and containing an elastomeric material, wherein the head contains bristles extending from the face in direction B.
Figure 6:
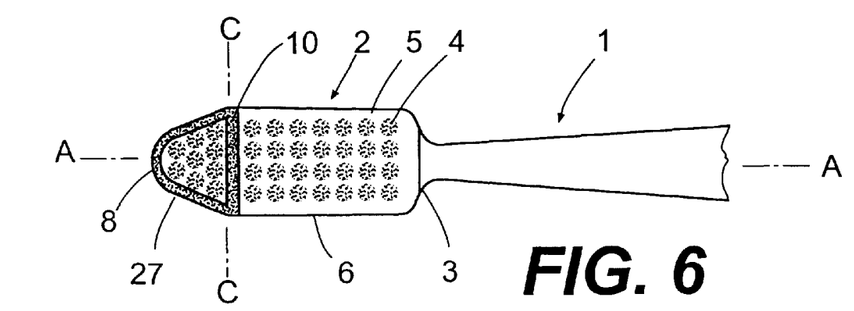

The elastomeric material 10 is extended around the tip 8 of the head 2 to form an external buffer around the tip 8 of the head 2.

Figure 9:
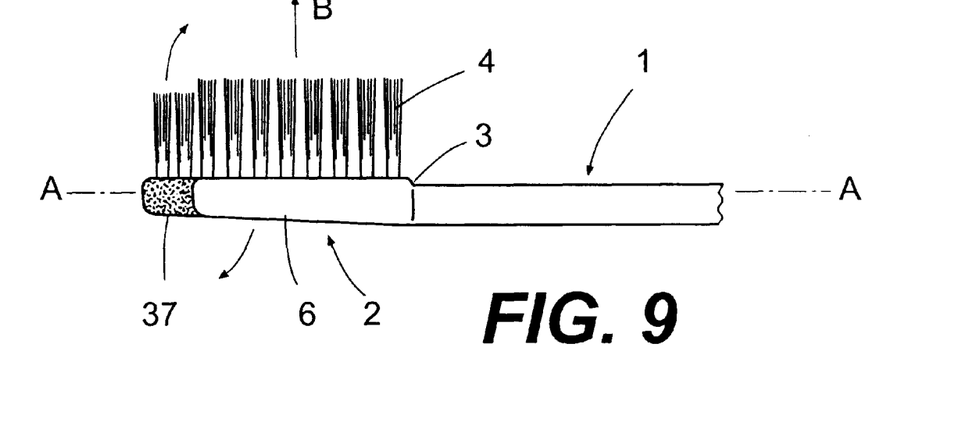
FIG. 9 shows a side view of a third embodiment of a toothbrush head integral with the handle and containing an elastomeric material, wherein the head has bristles extending from the face in direction B.
Figure 10:
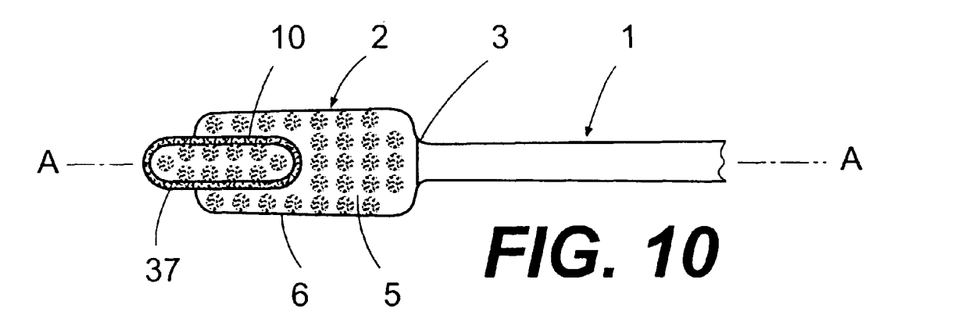
Figure 11:
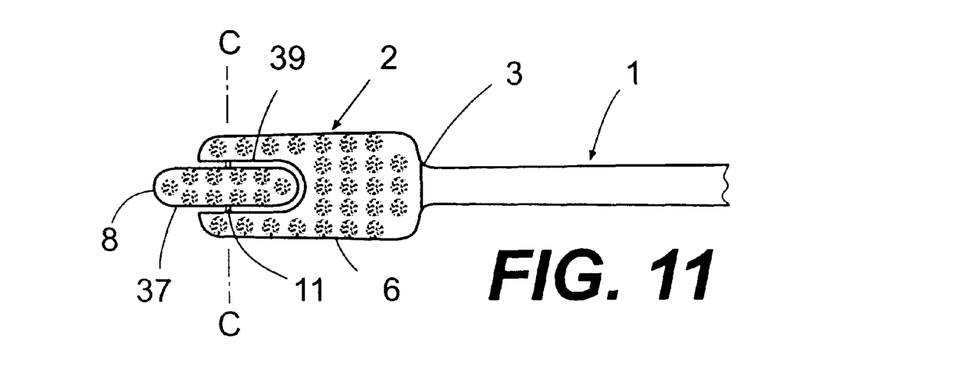
FIG. 11 shows a top view of the toothbrush of FIG. 9 without an elastomeric region.

Referring to FIGS. 9, 10 and 11 a toothbrush in which the tip region is constructed to pivot resiliently relative to the base region, during toothbrushing, about a widthways oriented pivot axis that crosses the tip region intermediate between its tip end and its base end, is shown. In FIG. 10 the toothbrush head is shown without the elastomeric material. In FIGS. 10 and 11 bristles are omitted from the base region 6 for clarity. Parts corresponding to FIGS. 1 to 8 are correspondingly numbered.

The head 2 comprises two regions. A substantially rigid base region 6 integral with the toothbrush handle 1 extends from the base end 3 of the head 2 to a distance in the longitudinal half of the head 2 furthest from the base 3 of the head. A tip region 37 extends from the extreme tip 8 of the head 2 toward the base region 6. Both the base region 6 and tip region 37 are bristle 4 bearing.

The tip region 37 is flexibly and resiliently linked to the base region 6 by a flexible link which comprises an aperture 39 in the head 2 material between the tip region 37 and the base region 6. The aperture 39 is in the form of a groove, open at the bristle face 5 of the head 2, and extending transversely across the entire width of the head 2. The groove 39 contains a resilient elastomeric material 10, which extends around the tip end of the tip region 37 to form a buffer. The base region 6 integrally extends in the tip direction in the form of two limbs forming a two pronged fork which partly surrounds the tip region 37 which lies between the limbs. The aperture 39 partly surrounds the tip region 37 both on the side which faces the base region 6, and around part of the longitudinal sides of the tip region 37, e.g. a generally crescent shaped aperture.

The aperture 39 is in the form of a slot extending widthways across the head 2 of the toothbrush and entirely through its thickness, but incorporating thin integral bridges 11, shown in FIG. 10, which are provided at points widthways diametrically opposite each other on either longitudinal side of the tip region, and which provide pivot points about which the tip region 37 can pivot, as shown by the arrows in FIG. 9, about the axis C—C shown in FIG. 11.

Figure 12:
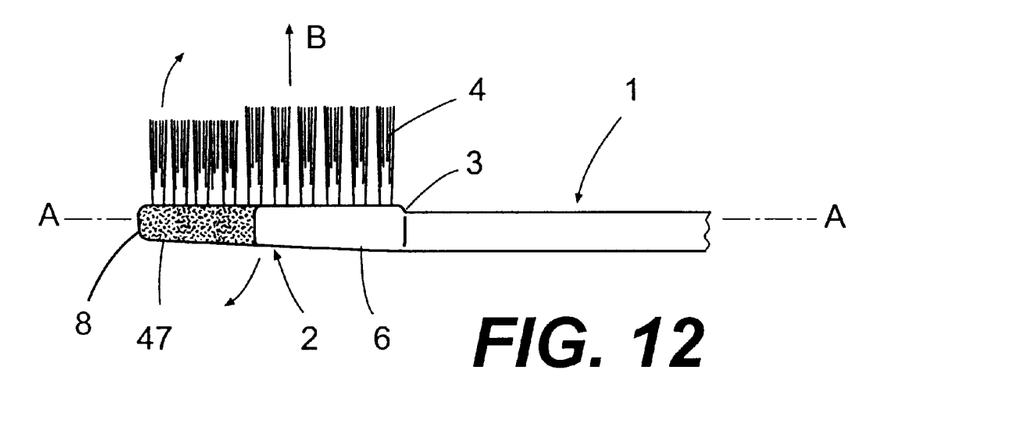
FIG. 12 shows a side view of a fourth embodiment of a toothbrush head integral with the handle and containing an elastomeric material, wherein the head has bristles extending from the face in direction B.
Figure 13:
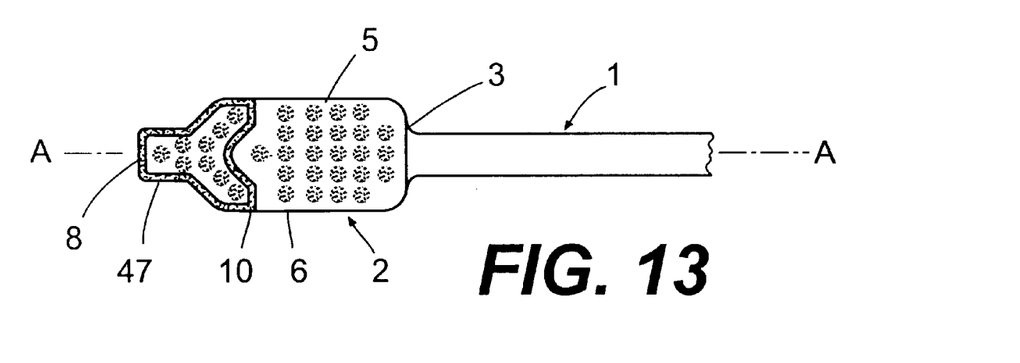
Figure 14:
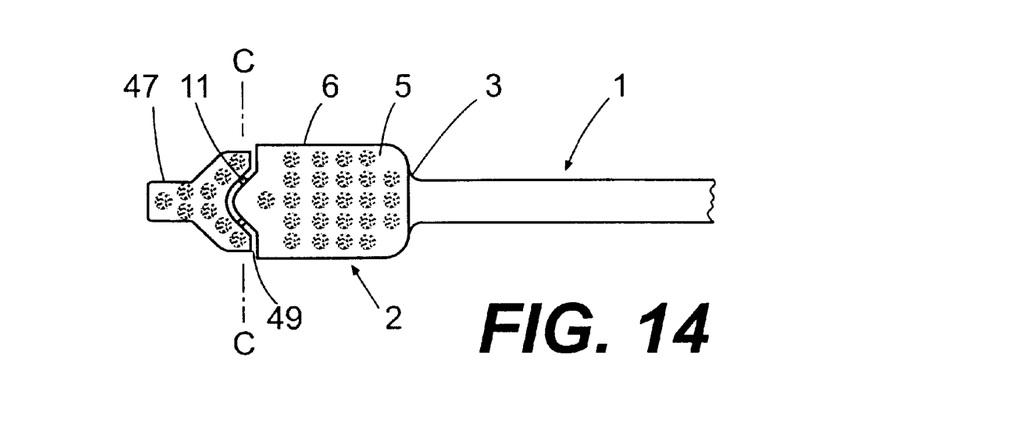

Referring to FIGS. 12, 13 and 14 a toothbrush in which the tip region is constructed to pivot resiliently relative to the base region, during toothbrushing, about a widthways oriented pivot axis that crosses the tip region intermediate between its tip end and its base end, is shown. In FIG. 13 the toothbrush head is shown without the elastomeric material. In FIGS. 13 and 14 the bristles are omitted from the base region for clarity. Parts corresponding to FIGS. 1–11 are numbered correspondingly.

The head 2 comprises two regions. A substantially rigid base region 6 integral with the toothbrush handle 1 extends from the base end 3 of the head 2 to a distance in the longitudinal half of the head 2 furthest from the base 3 of the head. A tip region 47 extends from the extreme tip 8 of the head 2 toward the base region 6. Both the base region 6 and tip region 47 are bristle 4 bearing.

The tip region 47 is flexibly and resiliently linked to the base region 6 by a flexible link which comprises an aperture 49 in the head 2 material between the tip region 47 and the base region 6. The aperture 49 is open at the bristle face 5 of the head 2, and extends widthways across the entire width of the head 2, and entirely through its thickness, but incorporates thin integral bridges 11, shown in FIG. 13, which are provided at points widthways diametrically opposite each other on either longitudinal side of the tip region. The aperture 49 contains a resilient elastomeric material 10 which is continued around the tip end of the tip region to form a buffer. The aperture 49 is essentially "V" shaped in plan, with its apex pointing toward the tip 8 of the toothbrush head.

The base end of the tip region 47 is in the form of two limbs which partly surround the tip end of the base region 6 which integrally extends in the tip direction. The tip region 47 is thereby of generally a "Y" shape with the tip end of the base region 6 lying between the upper limbs of the Y.

The tip region 47 can pivot about the axis C—C, about the pivot points provided by the bridges 11, so that as the tip end of the tip region 47 moves in the direction of the bristle direction B the base end of the tip region 47 moves downwards in the opposite direction as shown by the arrows in FIG. 12, i.e. in a see-saw action.

Figure 15:
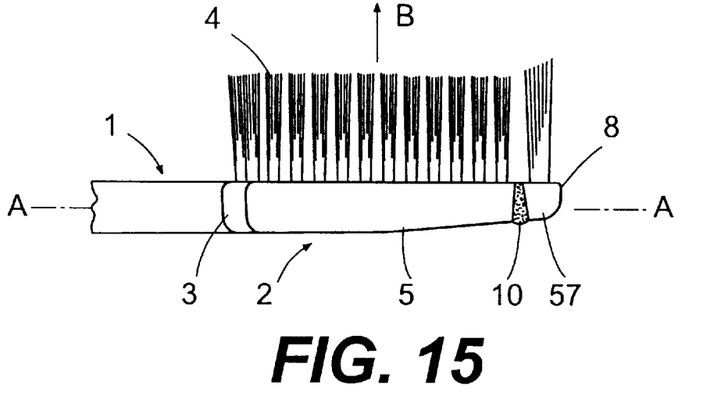
FIG. 15 shows a side view of a fifth embodiment of a toothbrush head integral with the handle and containing an elastomeric material, wherein the head has bristles that extend from the face in direction B.
Figure 16:
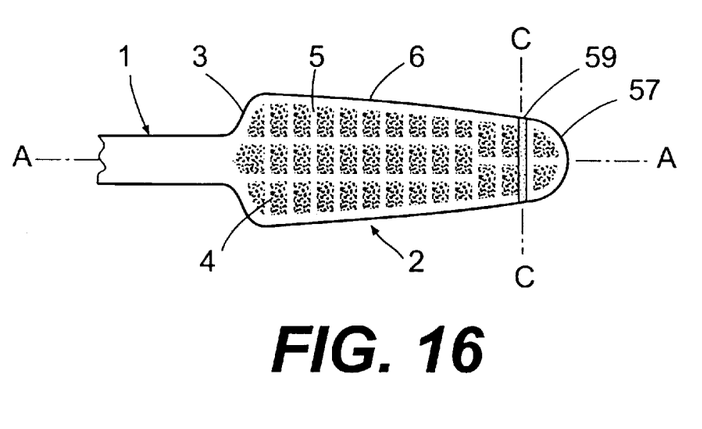
Figure 17:
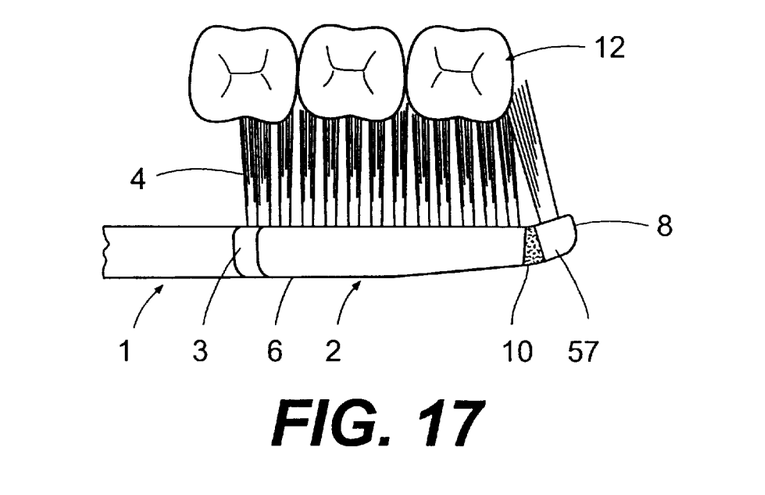
FIG. 17 shows a side view of the toothbrush of FIG. 16 as it cleans teeth.
Figure 18:
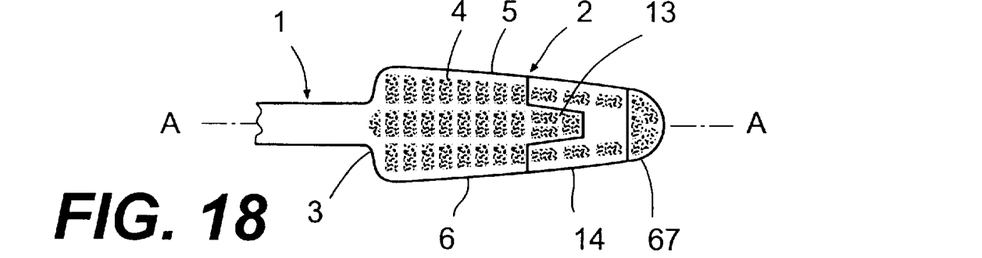
FIG. 18 shows a top view of a sixth embodiment of a toothbrush head integral with the handle and containing an elastomeric material.
Figure 19:
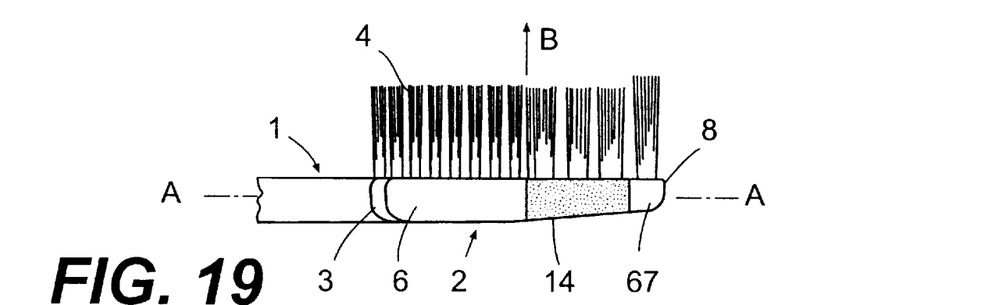
FIG. 19 shows a side view of the toothbrush of FIG. 18 having bristles that extend from the face in direction B.

Referring to FIGS. 15, 16 and 17 a variant of the toothbrush of FIGS. 1–8 is shown, corresponding parts being numbered correspondingly. Bristles 4 are shown in the form of rectangular or polygonal "mats", but may equally well be round tufts. In the toothbrush of FIGS. 15, 16 and 17 the aperture 59 extends all the way through the thickness of the head material. An elastomeric material 10 wholly fills the aperture 59 and is bonded to the opposite edges of the base region 6 and tip region 57 so as to hold the base region 6 and tip region 57 resiliently together. In FIG. 17 the folding of the tip region 57 during toothbrushing to clean the rearward facing surfaces of teeth 12.

Referring to FIGS. 18, 19, 20 and 21 a variant of the toothbrush of FIGS. 1 to 17 is shown, corresponding parts being numbered correspondingly.

Figure 20:
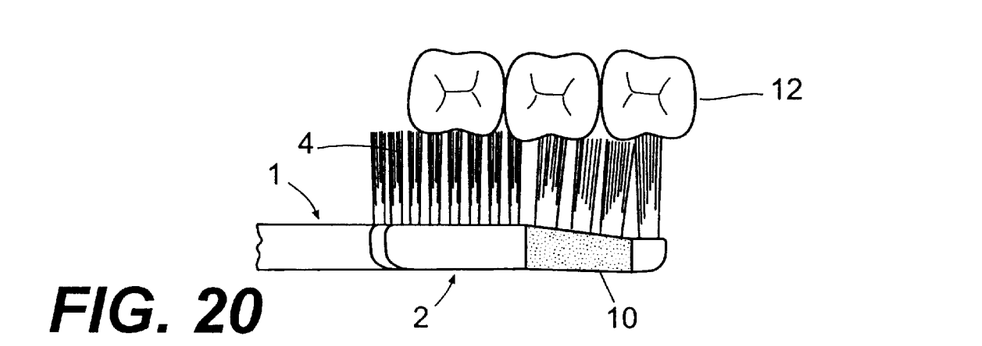
FIG. 20 shows a side view of the toothbrush of FIG. 18 as it cleans teeth.
Figure 21:
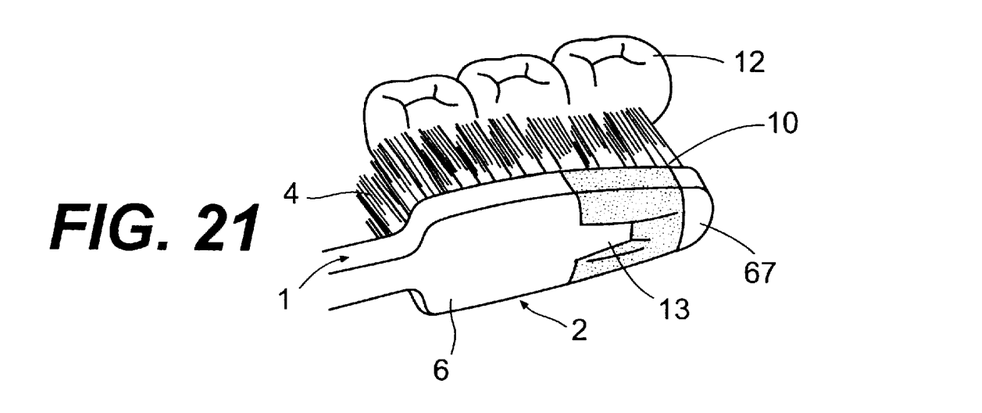
FIG. 21 shows a perspective view of the toothbrush of FIG. 18 as it cleans teeth.
Figure 22:
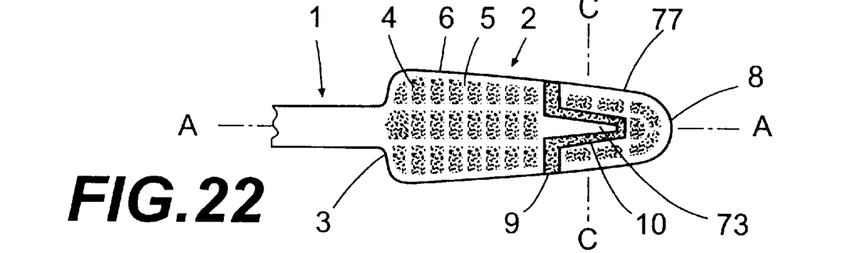
FIG. 22 shows a top view of a seventh embodiment of a toothbrush head integral with the handle and containing an elastomeric material.
Figure 23:
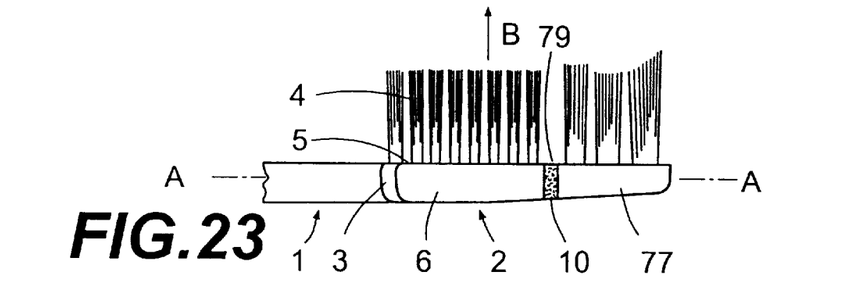
FIG. 23 shows a side view of the toothbrush of FIG. 22 with bristles extending from the face in direction B.

The bristles 4 are located in "mats" of generally rectangular shape in the base region 6 and accommodated to the shape of the tip region 67 but could equally well be round tufts. The base end of the tip region 67 is in the form of two limbs, the tip region 67 being generally in a "V" shape which partly surround a part 13 of the base region 6 which extends in the tip direction between them, with an aperture 69 between the tip region 67 and the base region 6, extending between the limbs and the part 13, the aperture containing an elastomeric material 10. The elastomeric material 10 wholly fills the aperture 69 and is bonded to the opposite edges of the base region 6 and tip region 67 so as to hold the base region 6 and tip region 7 resiliently together. The elastomeric material 10 is extended along the outer edge 14 of the composite region to assist in massaging the gums and in protecting the gums against impact with the toothbrush. In use as shown in FIG. 17 the tip region 67 can fold relative to the base region 6 to accommodate itself to the teeth as shown in FIG. 20.

Referring to FIGS. 22, 23, 24 and 25 another variant of the toothbrush of FIGS. 1 to 20 is shown, with corresponding parts being numbered correspondingly.

Figure 24:
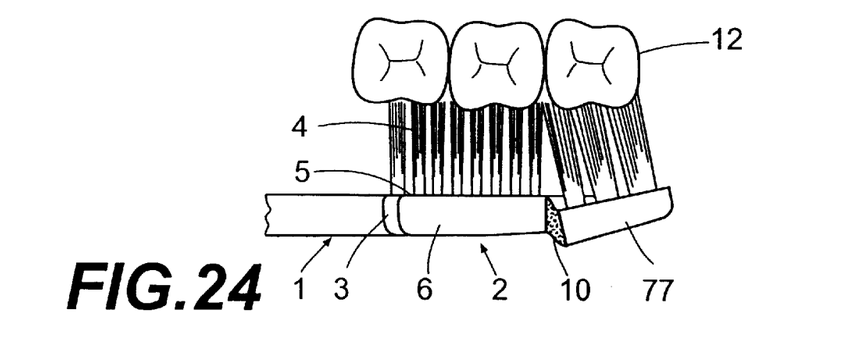
FIG. 24 shows a side view of the toothbrush of FIG. 22 as it cleans teeth.
Figure 25:
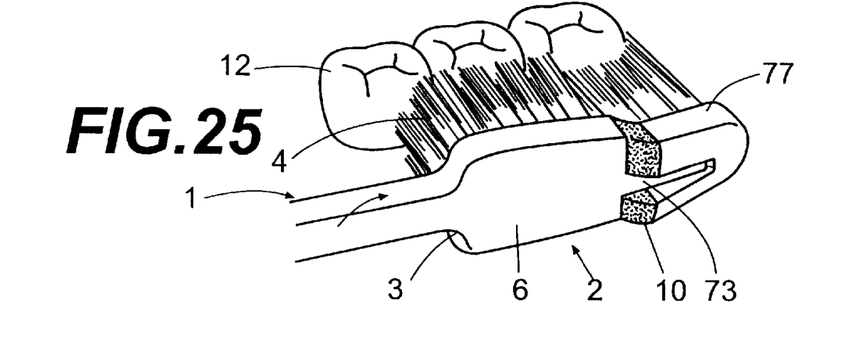
FIG. 25 shows a perspective view of the toothbrush of FIG. 22 as it cleans teeth.

The bristles 4 are located in "mats" of generally rectangular shape in the base region 6 and accommodated to the shape of the tip region 77, but could equally well be round tufts. The base end of the tip region 77 is in the form of two limbs, the tip region 77 being generally in a "V" shape which partly surround a part 73 of the base region 6 which extends in the tip direction between them, with an aperture 79 between the tip region 77 and the base region 6, extending between the limbs and the part 73, the aperture containing an elastomeric material 10. The elastomeric material 10 wholly fills the aperture 79 and is bonded to the opposite edges of the base region 6 and tip region 77 so as to hold the base region 6 and tip region 7 resiliently together such that the tip region 77 can pivot about axis C—C during use. This pivoting may be directed by the provision of plastics material bridges (not shown) between the base region 6 and tip region 77 aligned in the axis C—C. In use the tip region 77 can pivot about the axis C—C relative to the base region 6 to accommodate itself to the teeth as shown in FIGS. 24 and 25.

Referring to FIGS. 26, 27, 28 and 29 a toothbrush in which the tip region 87 is constructed to pivot resiliently relative to the base region 6, during toothbrushing, about a widthways oriented pivot axis C—C that crosses the tip region 87 intermediate between its tip end and its base end, is shown. Parts corresponding to FIGS. 1–25 are numbered correspondingly.

The head 2 comprises two regions. A substantially rigid base region 6 integral with the toothbrush handle 1 extends from the base end 3 of the head 2 to a distance in the longitudinal half of the head 2 furthest from the base 3 of the head. A tip region 87 extends from the extreme tip 8 of the head 2 toward the base region 6. Both the base region 6 and tip region 87 are bristle 4 bearing.

Figure 26:
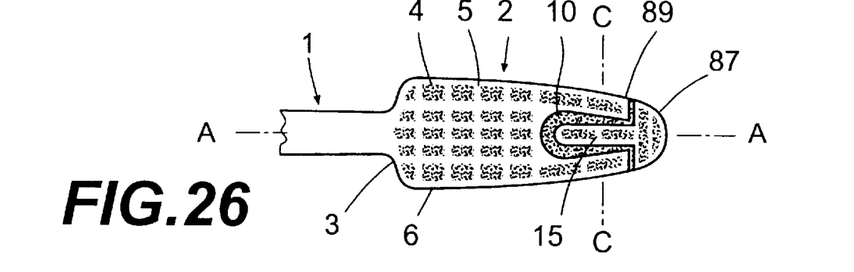
FIG. 26 shows a top view of an eighth embodiment of a toothbrush head integral with the handle and containing an elastomeric material.
Figure 27:
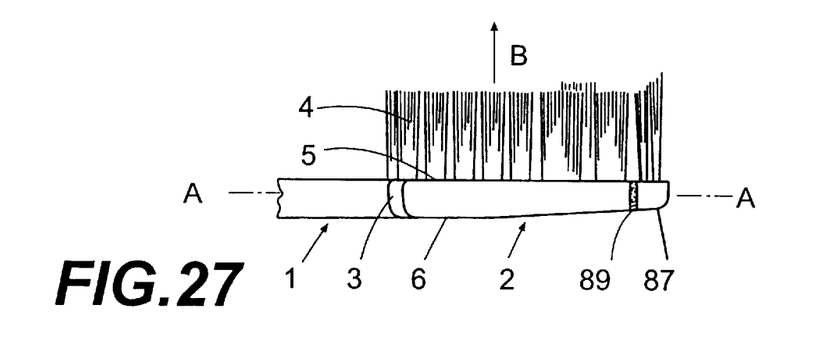
FIG. 27 shows a side view of the toothbrush of FIG. 26 with bristles extending from the face in direction B.
Figure 28:
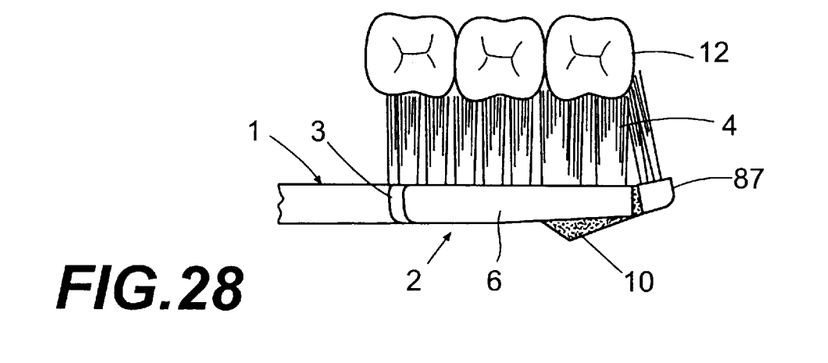
FIG. 28 shows a side view of the toothbrush of FIG. 26 as it cleans teeth.
Figure 29:
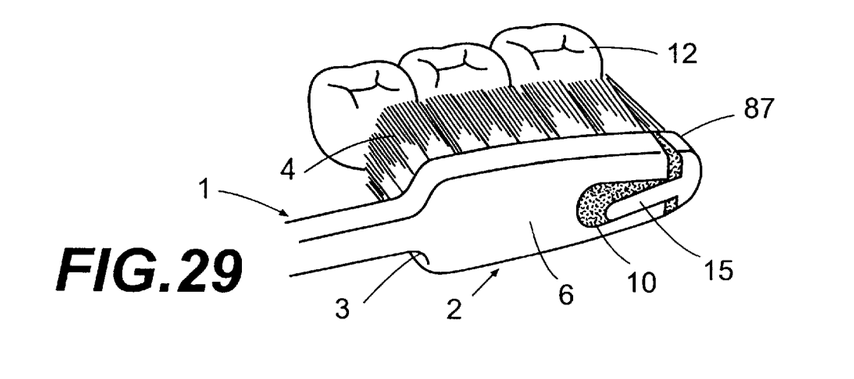
FIG. 29 shows a perspective view of the toothbrush of FIG. 26 as it cleans teeth.

The tip region 87 is flexibly and resiliently linked to the base region 6 by a flexible link which comprises an aperture 89 in the head 2 material between the tip region 87 and the base region 6. The aperture 89 is in the form of a groove, open at both the bristle face 5, and the opposite face, of the head 2. The groove 89 contains a resilient elastomeric material 10. The base region 6 integrally extends in the tip direction in the form of two limbs forming a two pronged fork which partly surrounds a part 15 of the tip region 87 which extends towards the base region 6 and which lies between the limbs.

The elastomeric material 10 wholly fills the aperture 89 and is bonded to the opposite edges of the base region 6 and tip region 87 so as to hold the base region 6 and tip region 87 resiliently together such that the tip region 87 can pivot about axis C—C during use. This pivoting may be directed by the provision of plastics material bridges (not shown) between the base region 6 and tip region 87 aligned in the axis C—C, and thereby accommodate itself to the shape of the teeth during toothbrushing.

Figure 30:
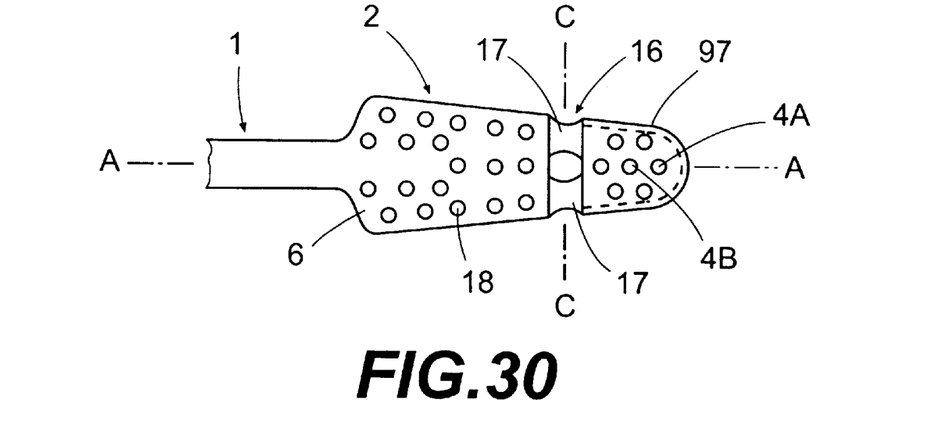
FIG. 30 shows a top view of an eleventh embodiment of a toothbrush head integral with the handle without elastomeric material.
Figure 31:
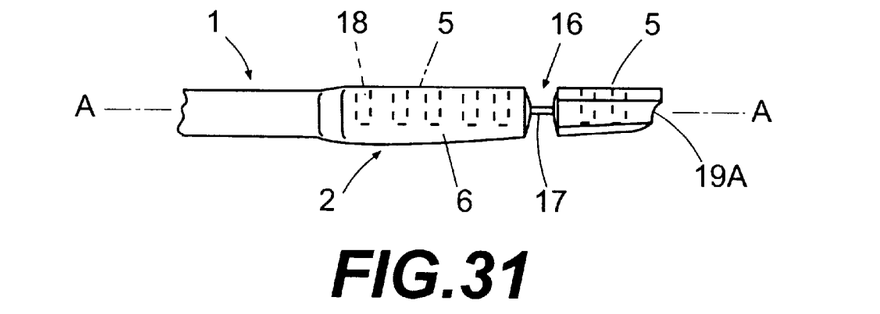
Figure 32:
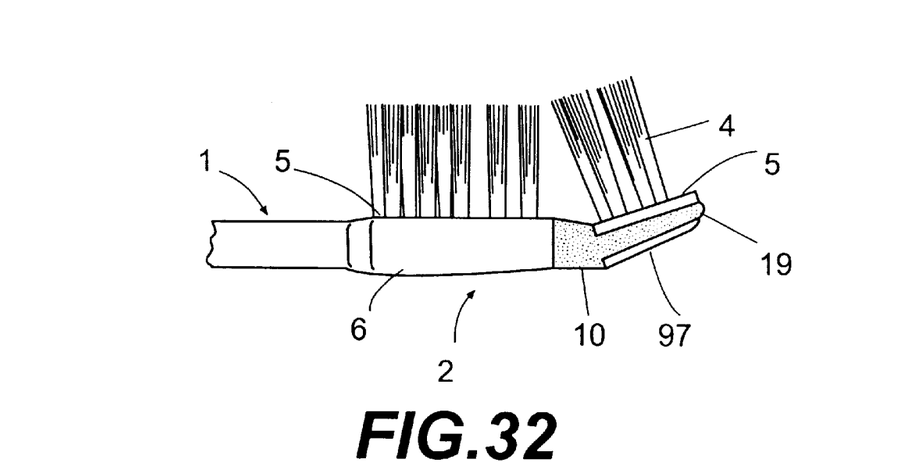
FIG. 32 shows a side view of the toothbrush of FIG. 30 with elastomeric material and bristles.

Referring to FIGS. 30, 31 and 32, an alternative construction of the head 2 of a toothbrush of this invention in which the tip region 97 is constructed to fold resiliently relative to the base region 6, during toothbrushing, about a widthways oriented fold axis C—C that crosses the head is shown on plan and in side views.

In FIGS. 30 and 31 the head 2 is shown without elastomeric material. Parts corresponding to those of FIGS. 1 to 4 are numbered correspondingly. The tip region 97 is generally triangular in shape with a rounded tip. A link region is provided by a chasm 16 between the tip region 97 and the base region 6 which is bridged by two strips 17 of a plastics material integral with the material of the head, the strips being thinner than the thickness of the head 2, and extending between the tip region 97 and base region 6 to bridge the chasm 16. Relative to the thickness of the toothbrush head 2 the strips are closer to the bristle face 5 than to the back of the head. The bristle face 5 of both the tip 97 and base region 6 are provided with socket holes 18 for the insertion of bristles 4. As shown in FIG. 31, in the tip region 97 the holes 18 are disposed to arrange bristles 4 in a pattern of discrete tufts 4A arranged in a generally circular or polygonal pattern, around a central tuft 4B.

As shown in FIG. 31 the "skeleton" consisting of just the plastic material parts of the head has been made by an injection moulding process, with the bristle face 5 substantially planar.

As shown in FIG. 32, the "skeleton" so formed has been folded about the axis C—C so that an obtuse angle of about 165° is formed between the bristle face 5 of the tip region 97 and of the base region 6. An elastomeric material 10 has been injected into the chasm 16, whilst the head is in its folded state, and is bonded to the sides of the chasm 16 and to the strips 17, filling the chasm 16 and covering the strips 17. Thereby the toothbrush head is retained in its folded state, and the tip region 97 is flexibly and resiliently linked to the base region 6.

The bristles 4 have been inserted by a conventional process, and the angle between the bristle face 5 of the tip region 97 and the base region 6 is such that the free ends of the bristles on the handle side of the tip portion are in close proximity to the free ends of bristles on the tip side of the base region. As shown in FIG. 32 the plane of the ends of bristles 4 on the tip region 97 slope upwards away from the bristle face 5 of the base region 6 in the direction away from the handle.

The elastomeric material 10 is extended around the tip 8 of the head 2 to form an external buffer 19 around the tip 8 of the head 2. For this purpose a moulding groove 18 is provided in the outer surface of the tip region 97.

Referring to FIGS. 33, 34, 35 and 36, another alternative construction of the head 2 of a toothbrush of this invention in which the tip region 107 is constructed to fold resiliently relative to the base region 6, during toothbrushing, about a widthways oriented fold axis C—C that crosses the head is shown on plan and in side views.

Figure 33:
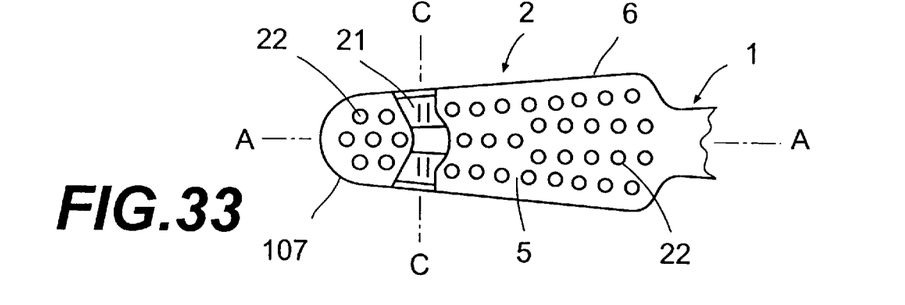
FIG. 33 shows a top view of a twelfth embodiment of a toothbrush head without elastomeric material.
Figure 34:
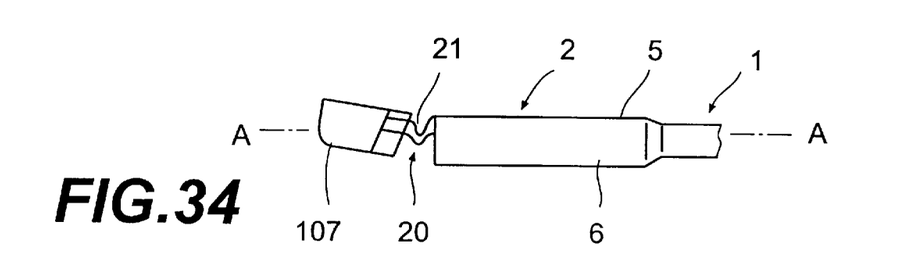
Figure 35:
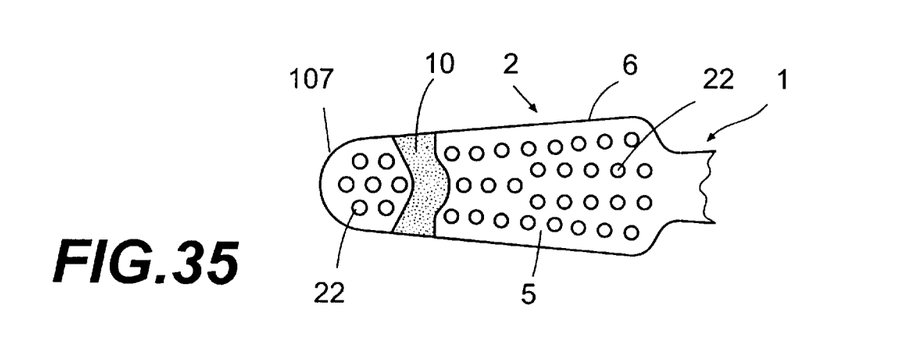
FIG. 35 shows the toothbrush head of FIG. 33 with elastomeric material.

In FIGS. 33 and 34 the head 2 is shown without elastomeric material. Parts corresponding to those of FIGS. 1 to 4 are numbered correspondingly. The tip region 107 is generally triangular in shape with a rounded tip. A link region is provided by a chasm 20 between the tip region 107 and the base region 6 which is bridged by two strips 21 of a plastics material integral with the material of the head, the strips being thinner than the thickness of the head 2, and extending between the tip region 107 and base region 6 to bridge the chasm 20. The chasm 20 is essentially "V" shaped in plan looking down onto the bristle face 5, with the apex of the "V" pointing toward the handle 2. Relative to the thickness of the toothbrush head 2 the strips are closer to the bristle face 5 than to the back of the head. The strips 21 are not planar, but are curved in and out of the plane of the base region 6 and tip region 107.

The bristle face 5 of both the tip 107 and base region 6 are provided with socket holes 22 for the insertion of bristles 4. As shown in FIGS. 33–36, in the tip region 107 the holes 22 are disposed to arrange bristles 4 in a pattern of discrete tufts arranged in a generally circular or polygonal pattern, around a central tuft.

Figure 36:
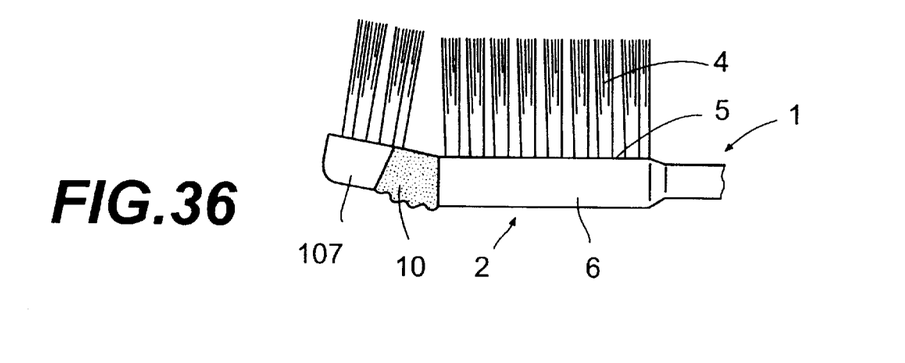
FIG. 36 shows a side view of the toothbrush of FIG. 35 with elastomeric material and bristles.

As shown in FIGS. 33 and 36 the "skeleton" consisting of just the plastic material parts of the head has been made by an injection moulding process, with the bristle face 5 folded about the axis C—C so that an obtuse angle of about 165° is formed between the bristle face 5 of the tip region 107 and of the base region 6.

An elastomeric material 10 has been injected into the chasm 20, whilst the head is in its folded state, and is bonded to the sides of the chasm 20 and to the strips 21, filling the chasm 20 and covering the strips 21. Thereby the toothbrush head is retained in its folded state, and the tip region 107 is flexibly and resiliently linked to the base region 6. The outer surface of the elastomeric material 10 has a corrugated surface as seen in FIG. 36.

The bristles 4 shown in FIG. 36 have been inserted by a conventional process, and the angle between the bristle face 5 of the tip region 107 and the base region 6 is such that the free ends of the bristles on the handle side of the tip portion are in close proximity to the free ends of bristles on the tip side of the base region. As shown in FIG. 36 the plane of the ends of bristles 4 on the tip region 107 slope upwards away from the bristle face 5 of the base region 6 in the direction away from the handle.

What is claimed is:

1. A toothbrush head comprising:
    a first substantially rigid segment including a first bristled surface and a first array of bristle tufts, wherein a plurality of the first array of tufts extend lengthwise across at least a portion of the first bristled surface, and a plurality of said first array of tufts extend widthwise across the portion of the first bristled surface;
    a second substantially rigid segment including a second bristled surface and a second array of bristle tufts, wherein a plurality of the second array of tufts extend lengthwise across at least a portion of the second bristled surface, and a plurality of said second array of tufts extend widthwise across said portion of the second bristled surface; and
    a region between the first segment and the second segment, the region including elastomeric material providing flexibility and resilience so that during tooth brushing the second rigid segment, including the second array, resiliently flexes with respect to the first rigid segment and the first array.

2. The toothbrush head as defined in claim 1, wherein the region between the first segment and the second segment defines a gap, and wherein said elastomeric material is deposited in the gap.

3. The toothbrush head as defined in claim 2 wherein a thinned region of plastic material bridges the gap and connects the first segment to the second segment.

4. The toothbrush head as defined in claim 1 wherein the region region is configured to resiliently flex under the action of tooth brushing to accommodate the toothbrush head to both convex and concave curves of a row of teeth.

5. The toothbrush head as defined in claim 1, wherein the region between the first and second segment defines a single gap.

6. A toothbrush head comprising:
    a first bristled segment;
    a second bristled segment flexibly connected to the first bristled segment; and
    a region between the first bristled segment and the second bristled segment, the region including elastomeric material configured to provide resilient flexing of the second bristled segment with respect to the first bristled segment during tooth brushing so that the toothbrush head accommodates differing profiles of an individual user's teeth.

7. The toothbrush head as defined in claim 6, wherein the region between the first segment and the second segment defines a gap, and wherein said elastomeric material is deposited in the gap.

8. The toothbrush head as defined in claim 7 wherein a thinned region of plastic material bridges the gap and connects the first segment to the second segment.

9. The toothbrush head as defined in claim 8 wherein the region region is configured to resiliently flex under the action of tooth brushing to accommodate the toothbrush head to both convex and concave curves of a row of teeth.

10. A toothbrush head comprising:
    a first substantially rigid segment including a first bristled surface and a first array of bristle tufts, wherein a plurality of the first array of tufts extend lengthwise across at least a portion of the first bristled surface, and a plurality of the first array of tufts extend widthwise across the portion of the first bristled surface;
    a second substantially rigid segment including a second bristled surface and a second array of bristle tufts, wherein a plurality of the second array of tufts extend lengthwise across at least a portion of the second bristled surface, and a plurality of the second array of tufts extend widthwise across the portion of the second bristled surface; and
    a region between the first segment and the second segment, the region including a flexible and resilient elastomeric material enabling the second rigid segment, including the second array, to resiliently fold with respect to the first rigid segment and the first array.

11. The toothbrush head as defined in claim 10, wherein the region between the first and second segment defines a single gap.

12. A method of making a flexible head toothbrush, comprising:
    forming a toothbrush frame from plastic material, the frame including a handle and at least two head segments having a gap between the head segments;
    depositing elastomeric material in the gap in a quantity and configuration sufficient to permit the elastomeric material to provide resilient flexing of one of the head segments relative to another of the head segments during tooth brushing; and
    attaching bristles to the head segments.

13. The method claim as defined in claim 12 wherein the frame is injection molded from said plastic material.

14. The method as defined in claim 12 further comprising the step of forming a connecting ligament, bridging the gap, between the first segment and the second segment.

15. The method claim as defined in claim 12 wherein the elastomeric material is injected into said gap.

* * * * *

UNITED STATES PATENT AND TRADEMARK OFFICE
CERTIFICATE OF CORRECTION

PATENT NO.   : 6,178,582 B1
DATED        : January 30, 2001
INVENTOR(S)  : Hans Halm It is certified that error appears in the above-identified patent and that said Letters Patent is hereby corrected as shown below:

Column 13, claim 4,
Line 48, delete "region" (second ocurrence).

Column 14, claim 9,
Line 14, delete "region" (second occurrence).

Signed and Sealed this

Sixth Day of November, 2001

Attest:

NICHOLAS P. GODICI
Acting Director of the United States Patent and Trademark Office Attesting Officer